United States Patent [19]
Miller et al.

[11] Patent Number: 6,123,672
[45] Date of Patent: Sep. 26, 2000

[54] COLOR FLOW IMAGING FOR ENHANCING SEGMENTATION AND FLOW DYNAMICS

[75] Inventors: Steven Charles Miller, Pewaukee; Anne Lindsay Hall, New Berlin, both of Wis.

[73] Assignee: General Electric Company, Milwaukee, Wis.

[21] Appl. No.: 09/224,940

[22] Filed: Dec. 31, 1998

[51] Int. Cl.[7] .................................................. A61B 8/00
[52] U.S. Cl. ............................................................. 600/455
[58] Field of Search .................................. 600/440, 441, 600/454–457; 73/861.25

[56] References Cited

U.S. PATENT DOCUMENTS

| | | | |
|---|---|---|---|
| 5,363,851 | 11/1994 | Hall et al. ................................ | 600/455 |
| 5,467,770 | 11/1995 | Smith et al. ............................. | 600/454 |
| 5,718,229 | 2/1998 | Pesque et al. .......................... | 600/441 |
| 5,860,924 | 1/1999 | Quistgaard .............................. | 600/441 |
| 5,961,460 | 10/1999 | Guracar et al. ......................... | 600/440 |

*Primary Examiner*—Francis J. Jaworski
*Attorney, Agent, or Firm*—McAndrews, Held & Malloy; Christian G. Cabou; Phyllis Y. Price

[57] ABSTRACT

An ultrasonic imaging system for displaying color flow images includes a receiver which generates color flow signals corresponding to frames obtained from different pulse repetition rates and different numbers of transducer stimulations per beam position. The color flow signals are selected and combined to enable visualization of fluid (e.g., blood) flow dynamics while maintaining segmentation of fluid flow from other tissue.

20 Claims, 6 Drawing Sheets

COLOR FLOW IMAGING FOR ENHANCING SEGMENTATION AND FLOW DYNAMICS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to acoustical imaging and, more specifically, relates to the production of color flow images based on the Doppler shift of ultrasonic signals.

All known color flow ultrasound imaging systems currently trade off the ability to segment wall motion from fluid flow (e.g., blood flow) against the ability to visualize rapid flow dynamics. Such segmentation requires large packet sizes which reduce the frame rate to the point that arterial flow dynamics can not be visualized. Extremely small packet sizes, such as 2 or 3 firings of an ultrasound transducer, allow good visualization of flow dynamics at the cost of little ability to suppress wall flash. This invention eliminates the compromise required by the known systems and enables visualization of rapid flow dynamics while enabling the image of flow regions to be segmented from the image of wall or tissue regions.

BRIEF SUMMARY OF THE INVENTION

The present invention is useful in an ultrasound system capable of stimulating a vibratory energy transducer to generate beams of ultrasound waves and to direct the beams at predetermined angular positions through a subject under study. The preferred embodiment includes improved techniques for providing a color display of one or more characteristics of fluid flow, such as blood flow, in the tissue of the subject. The techniques include generating first receiver signals corresponding to ultrasound waves backscattered from a predetermined range of distances within the subject in response to generation of a predetermined first number of stimulations of the transducer per beam position at a predetermined first stimulation repetition rate. Second receiver signals also are generated corresponding to ultrasound waves backscattered from the subject in response to generation of a predetermined second number of stimulations of the transducer per beam position at a predetermined second stimulation repetition rate. The receiver signals preferably are generated by an ultrasound receiver. First color flow signals are generated indicating first characteristics of the fluid flow in response to the first receiver signal. Second color flow signals also are generated indicating second characteristics of the fluid flow in response to the second receiver signals. The first and second color flow signals preferably are generated with a color flow processor. Combinations of the first and second color flow signals are selected, preferably by use of a logic unit, such as a processor.

By using the foregoing techniques, flow dynamics may be optimally displayed with minimal wall motion flash. For example, such a result may be achieved by combining image frames with different processing parameters. That is, segmentation frames with a larger number of firings per beam position (packet sizes) and/or lower pulse repetition frequencies (PRFs) may be used to segment flow regions from wall/tissue regions in a displayed image. Flow dynamic frames with higher PRFs and lower packet sizes may be used to provide rapid updates allowing better flow dynamic visualization in the displayed image. The dynamic flow is only displayed in the areas segmented as flow in the corresponding segmentation frame. The correspondence may be according to the nearest frame in time or, through the use of ECG triggers, the nearest frame to same point in the heart cycle.

The foregoing techniques allow visualization of rapid flow dynamics at high frame rates with low packet sizes while retaining the ability to suppress wall flash. For example, during one of every few frames (or heart cycles), segmentation frame(s) may be fired. The image data from these frames are stored. When subsequent rapid dynamic flow frames are fired, their data may be fused with the segmentation frames such that flow is not displayed in regions determined to be wall in the corresponding segmentation frame.

DETAILED DESCRIPTION OF THE INVENTION

Figure 1:
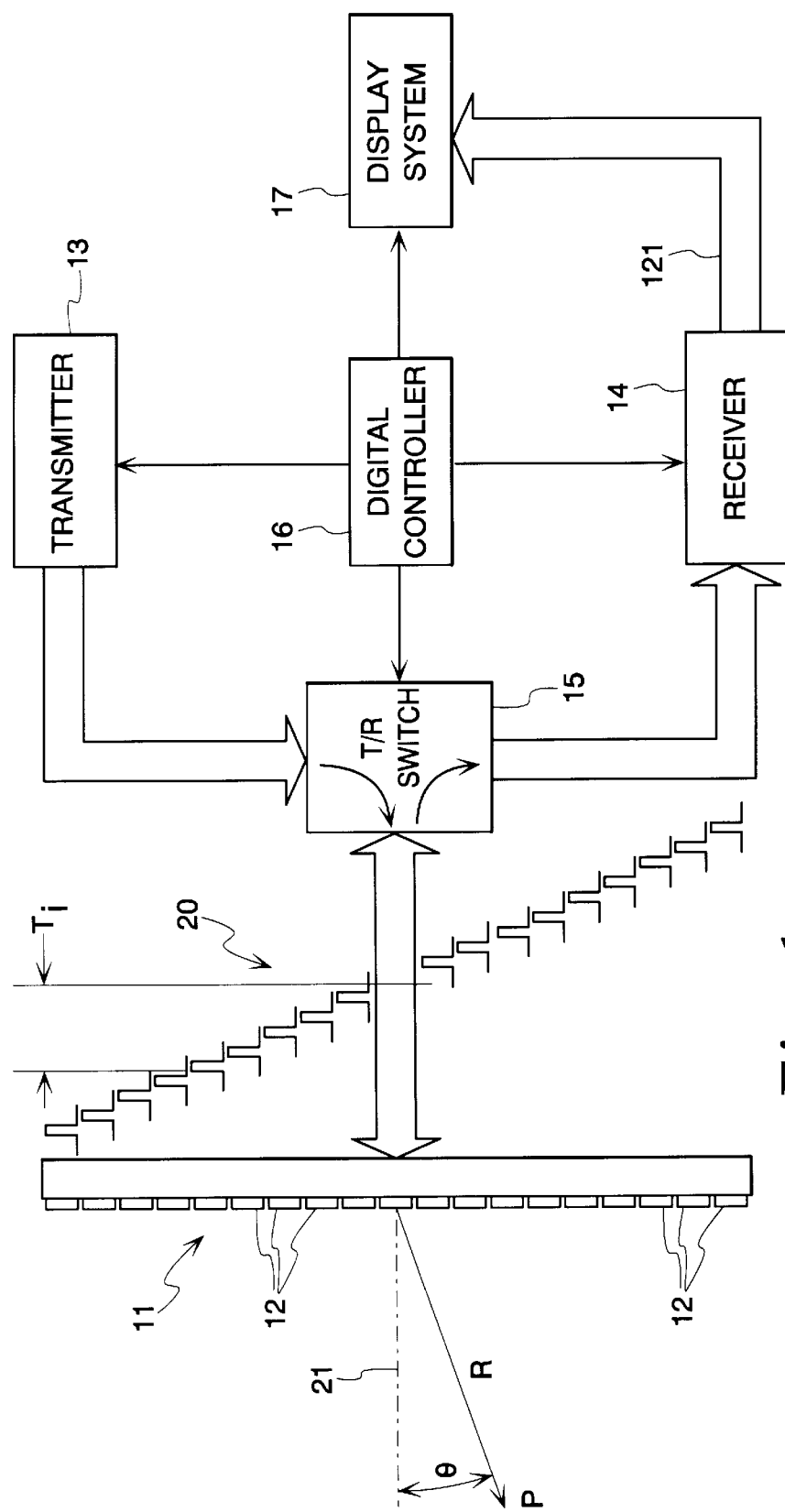
FIG. 1 is a schematic block diagram of an ultrasonic imaging system employing a preferred embodiment of the present invention.

Referring to FIG. 1, a vibratory energy imaging system includes a transducer array 11 comprised of a plurality of separately driven elements 12 which each produce a burst of ultrasonic energy when energized by a stimulating pulsed waveform produced by a transmitter 13. The ultrasonic energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller 16 responsive to commands by a human operator. A complete scan is performed by acquiring a series of echoes in which switches 15 are sent to their transmit position, transmitter 13 is gated on momentarily to energize each transducer element 12, switches 15 are then set to their receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the vibrational energy produced, e.g., ultrasonic energy, is directed, or steered, in a beam. A B-scan can therefore be performed by moving this beam through a set of angular positions from point-to-point rather than physically moving transducer array 11. To accomplish this, transmitter 13 imparts a time delay ($T_i$) to the respective pulsed waveforms 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11. As the time delay ($T_i$) is increased as illustrated in FIG. 1, the ultrasonic beam is directed downward from central axis 21 by an angle θ. The relationship between the time delay $T_i$ applied to each $i^{th}$ signal from one end of the transducer array (i=1) to the other end (i=n) is given by the following relationship:

$$T_i = R_T/c - \sqrt{R_{T/c}^2 + (x/c)^2 - 2xR_T \sin\theta/c^2} \qquad (1)$$

where:
- x=distance of center of transducer element 12 from center of transducer array;
- θ=transmit beam angle,
- c=velocity of sound in the object under study, and
- $R_T$=range at which transmit beam is focused.

The time delays $T_i$ in equation (1) have the effect of steering the beam in the desired angle θ, and causing it to be focused at a fixed range $R_T$. A sector scan is performed by progressively changing the time delays $T_i$ in successive excitations. The angle θ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to the differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each and sum them together to provide a single echo signal which accurately indicates the total ultrasonic energy reflected from point P located at R along the ultrasonic beam oriented at the angle θ.

To simultaneously sum the electrical signals produced by the echoes from each transducer element 12, time delays and phase shifts are introduced into each separate transducer element channel of receiver 14. The beam time delays for reception are the same delays ($T_i$) as the transmission delays described above. However, in order to dynamically focus, the time delay and phase shift of each receiver channel is continuously changing during reception of the echo to provide dynamic focusing of the received beam at the range R from which the echo signal emanates. The exact equation for the time delay $T_d$ imposed on the signal received by each transducer element is as follows:

$$T_d = t/2 - \sqrt{(t/2)^2 + (x/c)^2 - (xt/c)\sin(\theta)} \qquad (2)$$

where:
- t=elapsed time after transmission of sound from center of transducer array (i.e., START),
- c=velocity of sound in the object under study,
- θ=beam angle, and
- x=distance of center of element from center of transducer array.

The same calculation, suitably scaled, also provides the correct phase shift.

Under direction of digital controller 16, receiver 14 provides delays during the scan such that steering of receiver 14 tracks with the direction θ of the beam steered by transmitter 13 and it samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles (θ) is performed to provide the data necessary for display.

Figure 2:
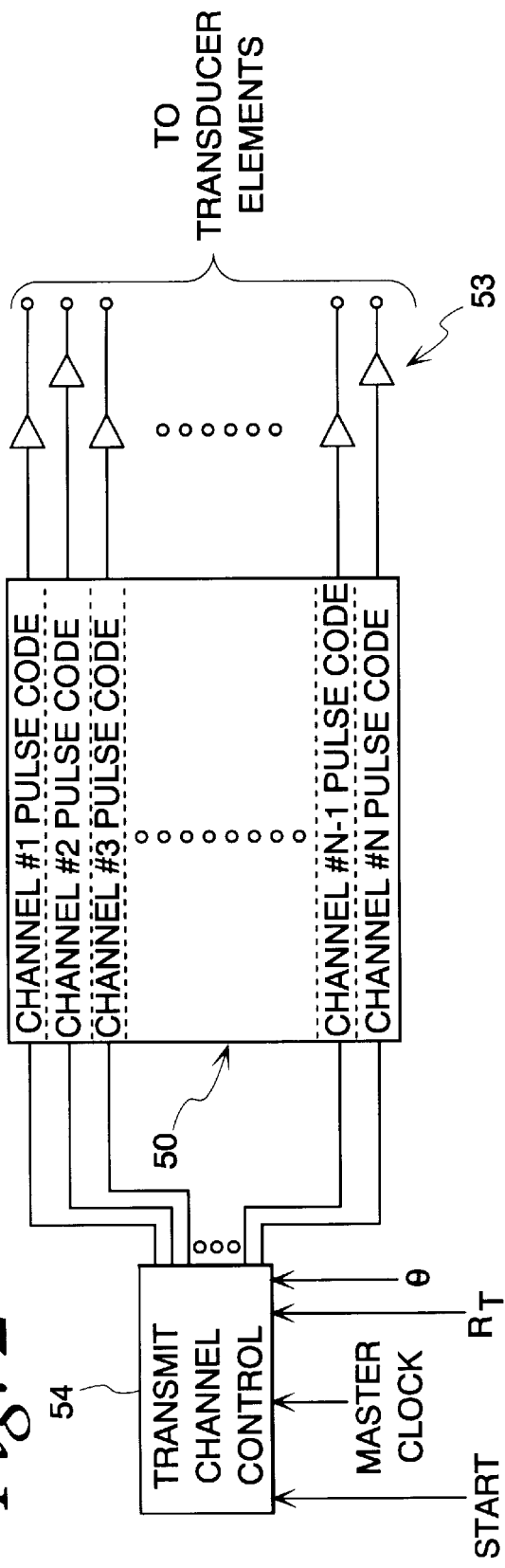
FIG. 2 is a schematic block diagram of a transmitter which forms part of the system of FIG. 1.
Figure 2A:
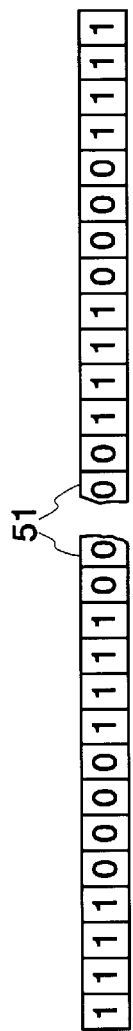
FIGS. 2A and 2B are graphical representations of the signal in any of the channels of transmitter 50 of FIG. 2.

Referring to FIG. 2 in conjunction with FIG. 1, transmitter 13 includes a set of channel pulse code memories indicated collectively as memories 50. In the preferred embodiment there are 128 separate transducer elements 12, and therefore, there are 128 separate channel pulse code memories 50. Each pulse code memory 50 is typically a 1-bit by 512-bit memory which stores a bit pattern 51 that determines the frequency of the ultrasonic pulse 52 to be produced. In the preferred embodiment, this bit pattern is read out of each pulse code memory 50 by a 40 MHz master clock and applied to a driver 53 which amplifies the signal to a power level suitable for driving transducer 11. In the example shown in FIG. 2a, the bit pattern is a sequence of four "1" bits alternated with four "0" bits to produce a 5 MHz ultrasonic pulse 52; however, other carrier frequencies ($F_0$) may be employed in the preferred embodiment, such as 2.5, 3.75, 6.25, 7.5, 8.75 and 10 MHz. Transducer elements 12 to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

Figure 2B:
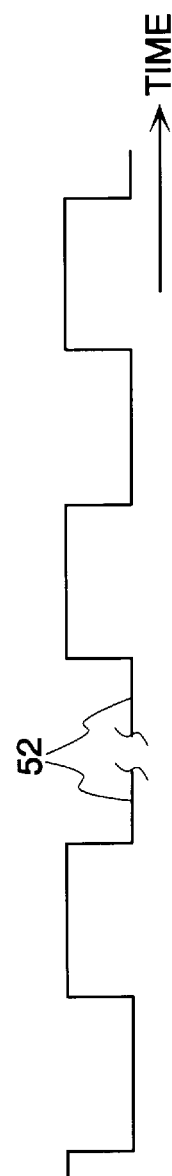

As indicated above, to steer the transmitted beam of the ultrasonic energy in the desired direction (θ), pulses 52 for each of the n channels, such as shown in FIG. 2B, must be delayed by the proper amount. These delays are provided by a transmit control 54 which receives four control signals (START, MASTER CLOCK, $R_T$ and θ) from digital controller 16 (FIG. 1). Using the input control signal θ, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, the 40 MHz MASTER CLOCK signal is gated through to the next channel pulse code memory 50 until all n=128 channels are producing their ultrasonic pulses 52. Each transmit channel 50 is reset after its entire bit pattern 51 has been transmitted and transmitter 13 then waits for the next θ and next START control signals from digital controller 16. As indicated above, in the preferred embodiment of the invention a complete B-scan is comprised of 128 ultrasonic pulses steered in Δθ increments of 0.70° through a 90° sector centered about central axis 21 (FIG. 1) of the transducer 11.

For a detailed description of the transmitter 13, reference is made to commonly assigned U.S. Pat. No. 5,014,712 issued May 14, 1991, and entitled "Coded Excitation For Transmission Dynamic Focusing of Vibratory Energy Beam," incorporated herein by reference.

Figure 3:
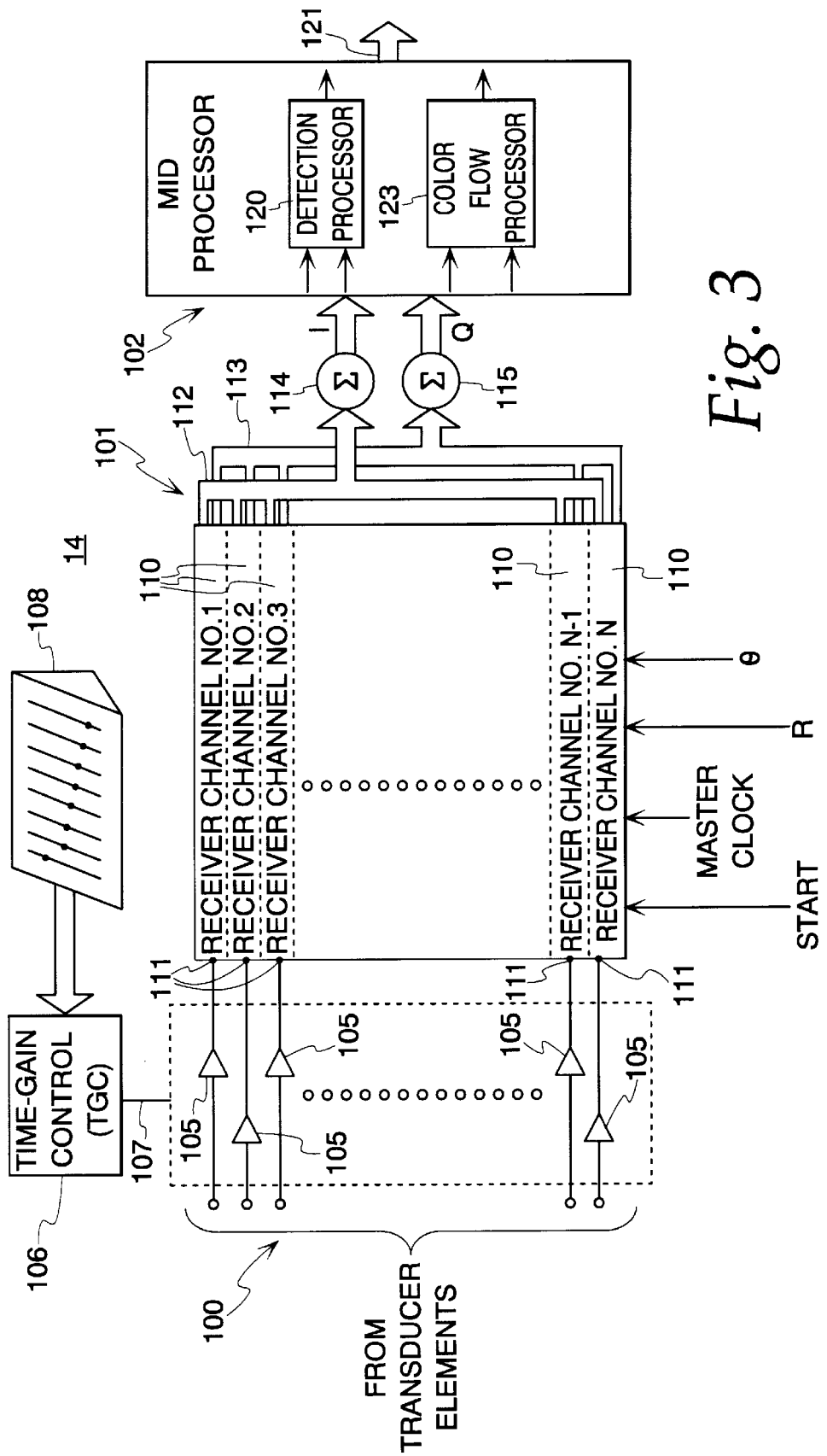
FIG. 3 is a schematic block diagram of a receiver which forms part of the system of FIG. 1.

Referring particularly to FIG. 3, receiver 14 is comprised of these sections: a time-gain control section 100, a receive beam forming section 101, and a mid processor 102. Time-gain control (or TGC) section 100 includes an amplifier 105 for each of the n=128 receiver channels and a time-gain control circuit 106. The input of each amplifier 105 is connected to a respective one of transducer elements 12 to receive and amplify the echo signal which it receives. The amount of amplification provided by amplifiers 105 is controlled through a control line 107 that is driven by TGC circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the section scan. The time interval over which the echo signal is acquired determines the range from which it emanates, and this time interval is divided into eight segments by TGC circuit 106. The settings of the eight potentiometers are employed to set the gains of amplifiers 105 during each of the eight respective time intervals so that the echo signal is amplified in ever increasing amounts over the echo signal acquisition time interval.

The receive beam forming section 101 of receiver 14 includes n=28 separate receiver channels 110. As will be explained in more detail below, each receiver channel 110 receives the analog echo signal from one of amplifiers 105 at an input 111, and it produces a stream of digitized output values on an I bus 112 and a Q bus 113. Each of these I and Q values represents a demodulated sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam (θ). In the preferred embodiment, each echo signal is sampled at about 512 points over the entire range of the scan line (typically 40 to 200 millimeters).

For a more detailed description of receiver 14, reference is made to commonly assigned U.S. Pat. No. 4,983,970, issued Jan. 8, 1991, and entitled "Method And Apparatus for Digital Phase Array Imaging," which is incorporated herein by reference.

Referring still to FIG. 3, mid processor section 102 receives the beam samples from summing points 114 and 115. The I and Q values of each beam sample are digital numbers representing the in-phase and quadrature components of the magnitude of the reflected sound from a point (R, θ). Mid processor 102 can perform a variety of calculations on these beam samples, where choice is determined by the type of image to be reconstructed. For example, if a conventional magnitude image is to be produced, a detection processor 120 (FIG. 3) is implemented in which a digital magnitude M is calculated from each receive beam sample and produced at output 121 along with the R,θ coordinates of the reflection point, according to $$M=\sqrt{1+Q^2} \tag{3}$$

Detection processor 120 may also implement correction methods such as that disclosed in commonly assigned U.S. Pat. No. 4,835,689, issued May 30, 1989, and entitled "Adaptive Coherent Energy Beam Formation Using Phase Conjungation." Such correction methods examine the received beam samples and calculate corrective values that can be used in subsequent measurements by transmitter 13 and receiver 14 to improve beam focusing and steering. Such corrections are necessary, for example, to account for the nonhomogeneity of the media through which the sound from each transducer element travels during a scan.

The present invention relates particularly to a color flow processor 123 which is also located in mid-processor 102. Color flow processor 123, which is described in more detail below with respect to FIG. 5, receives the I and Q values of each demodulated and focused echo signal sample from summing points 114 and 115, and produces a 12-bit flow value at the mid processor output 121. This flow signal controls the red, green, and blue display colors, and applied to display system 17 along with the magnitude M for the same point. As explained in more detail below, the color indicated by this flow value is a function of the power of the Doppler signal resulting from the flow as measured by color flow processor 123.

Figure 4:
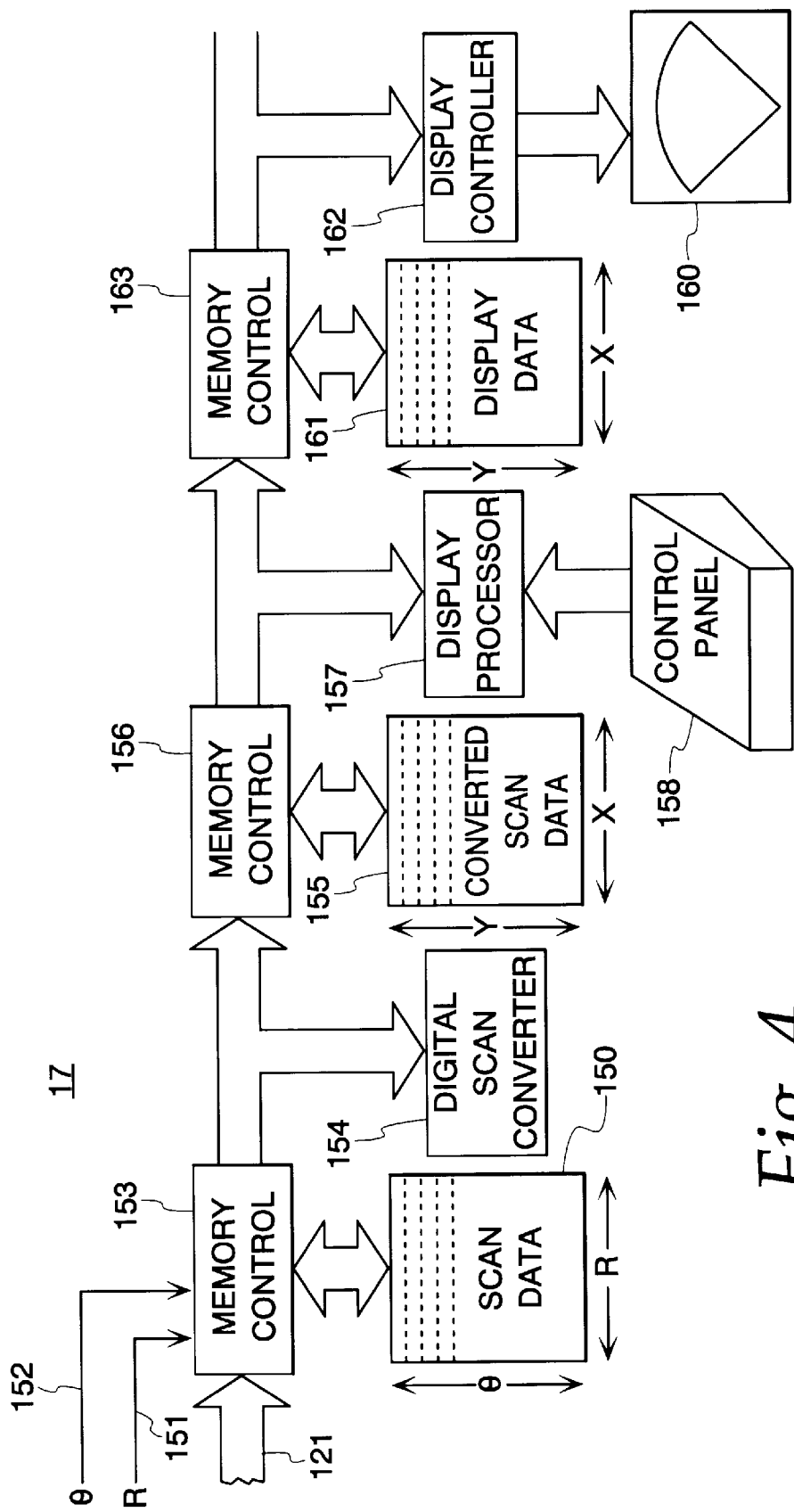
FIG. 4 is a schematic block diagram of the display system which forms part of the system of FIG. 1.

Referring particularly to FIGS. 1 and 4, receiver 14 generates a stream of 8-bit digital numbers at its output 121, which is applied to the input of display system 17. Each output includes an 8-bit tissue magnitude and a 12-bit flow value. These "scan data" are stored in a memory 150 as an array, with the rows of scan data array 150 corresponding with the respective beam angles (θ) that are acquired, and the columns of scan data array 150 corresponding with the respective ranges (R) at which samples are acquired along each beam. The R and θ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update scan data array 150.

Referring still to FIG. 4, the scan data in array 150 are read by a digital scan converter 154 and converted to a form producing the desired image. If a conventional B-scan image is being produced, for example, the tissue magnitude and flow values M(R,θ) stored in the scan data array 150 are converted to values M(x,y) which indicate gray shade (for tissues) and color (for flow) at pixel locations (x,y) in the image. Such a polar coordinate to Cartesian coordinate conversion of the ultrasonic image data is described for example, in an article by Steven C. Leavitt et al. in Hewlett-Packard Journal, October 1983, pp. 30–33, entitled "A Scan Conversion Algorithm for Displaying Ultrasonic Images."

Regardless of the particular conversion made by digital scan converter 154, the resulting image data are written to a memory 155 which stores a two-dimensional array of converted scan data. A memory control 156 provides dual-port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced values to a display memory 161.

Display memory 161 is shared with a display controller circuit 162 through a memory control circuit 163, and the values therein are mapped to control brightness and color of the corresponding pixels in display 160. Display controller 162 is a commercially available integrated circuit which is designed to operate the particular type of display 160 used. For example, display 160 may be a CRT (cathode ray tube), in which case display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of a particular ultrasound system. In the preferred embodiment described above, programmed microprocessors are employed to implement the digital scan converter and display processor functions, and the resulting display system is, therefore, very flexible and powerful.

Figure 5:
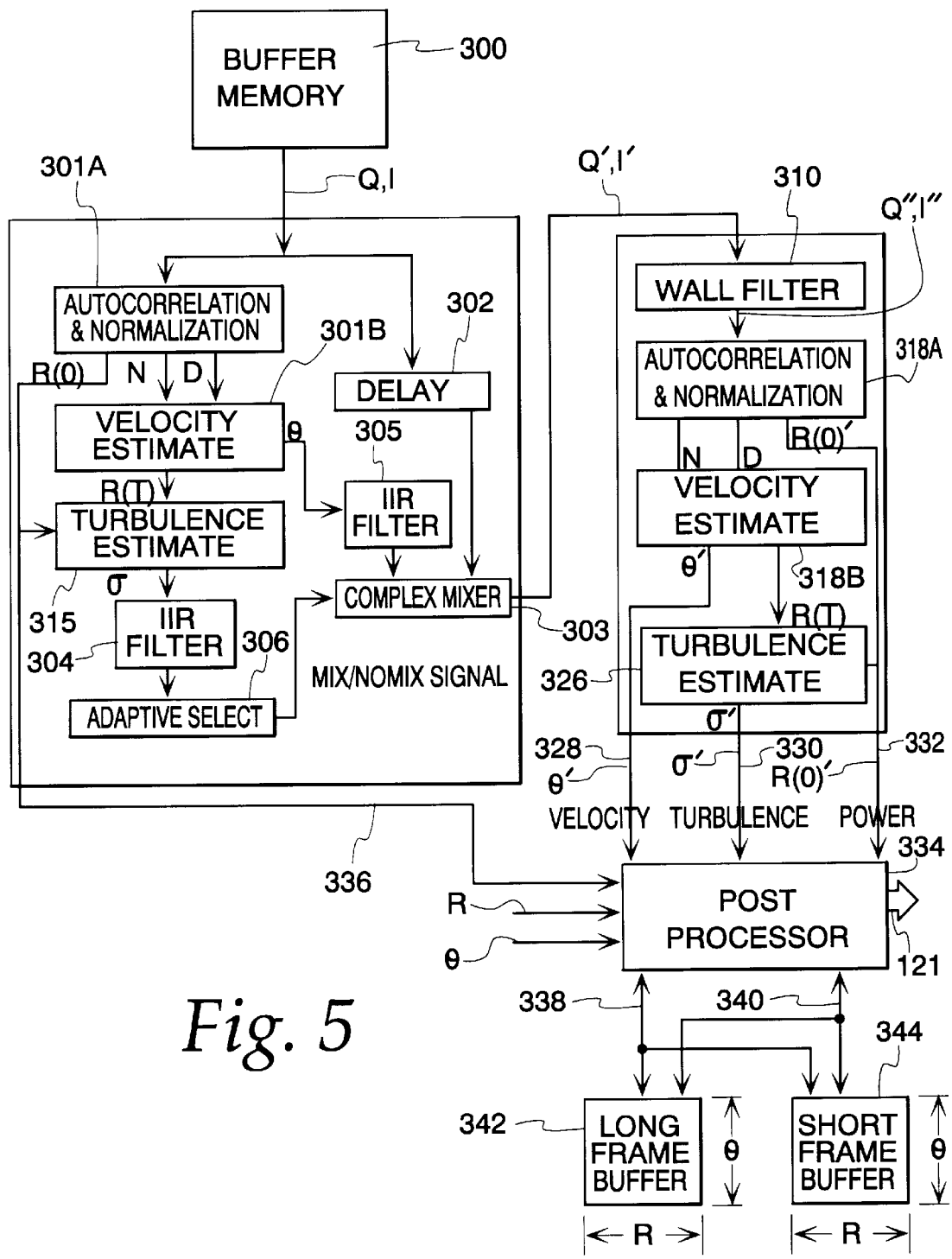
FIG. 5 is one form of the mid-processor 102 illustrated in FIG. 3.

Referring particularly to FIG. 5, color flow processor 123 of FIG. 3 may be constructed of commercially available integrated circuits. Processor 123 includes a buffer memory 300 which stores the I and Q samples of the demodulated echo signal produced by the beam forming section of the receiver and applies them to the I and Q inputs of an autocorrelation and normalization circuit 301A which passes its N and D outputs to a velocity estimate circuit 301B. The I and Q outputs from memory 300 also are passed to a delay FIFO 302. Circuits 301A and 301B may be constructed, for example, from a complex conjugate multiplier, a pair of delays and a pair of integrators as described by C. Kasai et al in an article in IEEE Transactions on Sonics and Ultrasonics, VOL. SU-32, No. 3, May 1985, entitled "Real-Time Tow-Dimensional Blood Flow Imaging Using Autocorrelation Technique," which is incorporated herein by reference. Circuit 301B produces an output signal θ which represents the mean value of the frequency of the n samples applied to its inputs. If there is no movement of the reflectors, there is no Doppler change in frequency of the echo samples and this output signal is zero. If there is motion in one direction, output signal θ has a positive value, and if motion is in the opposite direction, θ has a negative value.

The mean value output signal θ is applied through an IIR filter 305 to the reference input of a complex mixer circuit 303. Simultaneously, the delayed I and Q values of the same demodulated echo signal sample used to produce signal θ are applied to the inputs of complex mixer 303. Frequency shifted output signals I' and Q' are produced by complex mixer 303 according to the following equations:

$$I' = I \cos\theta + Q \sin\theta \quad (4)$$

$$Q^1 = I \sin\theta - Q \cos\theta \quad (5)$$

The effect of this complex mixing with mean frequency θ is to shift all the demodulated echo signal frequencies by the value −θ. Since in most situations the filter wall signal components dominate the echo signal, the measured mean frequency of the wall signal components and the shift in frequency by complex mixer 303 in essence shifts the mean value of the wall signal frequency zero, or D.C. For additional details about shifting the wall signal, see U.S. Pat. No. 5,349,524 which is incorporated by reference. The large wall signal component is shifted in frequency and is now substantially centered about D.C.

Referring still to FIG. 5, the shifted echo signal values I' and Q' are applied to the inputs of a high pass FIR (Finite Impulse Response) filter 310. FIR filter 310 is a commercially available integrated circuit, such as Plessey PDSP 16256A, which has a stop band centered at D.C.

Circuits 301A and 301B have outputs R(O) and R(T) from which the variance of the unfiltered baseband echo signal can be calculated. This calculation is performed by a turbulence estimate circuit 315 in accordance with the following equation:

$$\sigma^2 = (1 - |R(T)|/R(O))/T^2 \quad (6)$$

where T is the emission interval of ultrasonic pulses. This variance σ is an indication of the width of the wall signal components and, as shown in FIG. 5, is provided to a low pass IIR filter 304 which provides an input to an adaptive select circuit 306. As a result, the output signal of FIR filter 310 is a filtered echo signal which is comprised primarily of the flow signal components.

The filtered echo signal components I" and Q" produced by FIR filter 310 shown in FIG. 5 are supplied to a second autocorrelation and normalization estimator circuit 318A which provides outputs to a second velocity estimate circuit 318B. Circuit 318A is identical to circuit 301A, and circuit 318B is identical to circuit 301B. Velocity estimate circuit 318B produces at an output 328 a mean value signal θ' which is an estimate of the mean value of the shifted flow signal component frequencies. That is, θ' is an estimate of the mean Doppler shift of the flowing reflectors, which in turn is proportional to their mean velocity. Signal θ' forms one component of the flow signal which is produced by color flow processor 123.

To indicate the nature of the flowing scatterers, a turbulence calculator 326 is coupled to circuit 318B. Turbulence calculator 326 is identical to turbulence calculator 315 described above and produces an output signal σ' which indicates the frequency spread of the flow signal component of the baseband echo signal. This value is indicative of flow turbulence, since laminar flow has a very narrow range of velocities while turbulent flow is a mixture of many velocities. The 4-bit turbulence value σ' is supplied from turbulence calculator 326 on a conductor 330 as another component of the flow signal.

Circuit 318A also generates on a conductor 332 a power signal R(O)' which is an estimate of the power of the flow signal component of the baseband echo signal.

A post processor 334 receives the θ' signal on conductor 328, receives the σ' signal on conductor 330 and receives the (R)(O)' signal on conductor 332. Post processor 334 also receives a power signal (R)(O) on a conductor 336 from autocorrelation and normalization circuit 301A. Power value R(O) is used for thresholding the velocity and variance estimate signals on conductors 328 and 330. The estimates are then combined in a way determined by the operator of the system into one 8-bit primary output 338 and one 4-bit secondary output 340, based on the display mode that has been selected.

The primary and secondary outputs are sent to a long frame buffer 342 and a short frame buffer 344. The long frame buffer 342 stores values representing segmentation frames with a relatively large number of firings per beam position (packet size) and/or a relatively lower pulse repetition frequency or stimulation frequency (PRF) that are used to segment flow regions from wall and tissue regions in display system 17.

Short frame buffer 344 stores values corresponding to flow dynamic frames with relatively high PRFs and values resulting from relatively lower packet sizes that are used to provide an image of flow dynamics. That is, the values stored in short frame buffer 344 are used to provide rapid updates allowing better flow dynamic visualization.

The dynamic flow based on the data in buffer 344 is only displayed in areas segmented as flow by the values stored in long frame buffer 342.

In summary, the values stored in frame buffer 342 are based on a larger number of firings or stimulations of transducer 11 per beam position than the values stored in frame buffer 344. Likewise, the values stored in buffer 342 result from stimulation or pulse repetition rates that are less than the stimulation or pulse repetition rates which result in the values stored in frame buffer 344.

The value of the power signal generated on conductor 336 is compared to a predetermined threshold. If the value is larger than the threshold, the signals from post processor 334 are output through an output mode select block (not shown). If the value is less than the threshold, all outputs are loaded with a zero value. The output mode select block determines the output from the post processor 334 and ultimately to the scan converter as determined by the operator. The output from this select block is one 8-bit number and one 4-bit number. The possible modes are presented in the following table:

| Mode | 8 bit output | 4 bit output |
| --- | --- | --- |
| Velocity only | Velocity | N/A |
| Velocity - Variance | Velocity | Variance |
| Velocity - Power | Velocity | Power |
| Power only | Power | N/A |

Transducer 11 is stimulated in the previously described manner in order to produce the values for long frame buffer 342 every few heart cycles. The transducer 11 is stimulated more rapidly in order to produce the values stored in short frame buffer 344. Thus, short frame buffer 344 is refreshed many times per heart cycle.

After every refreshment of short frame buffer 344, post processor 334 selects combinations of the color flow signals from the long frame buffer 342 and the short frame buffer 344 for further processing. According to the preferred embodiment, processor 334 addresses each memory location in long frame buffer 342 and determines its value. If the value is zero or is below a predetermined threshold, little or no blood flow is indicated, and the data from the addressed long frame buffer 342 value is transmitted to bus 121. If the value at the addressed location in buffer 342 is a non-zero value which exceeds the threshold, then the corresponding address in short frame buffer 344 is accessed, and the data from that addressed location in buffer 344 is transmitted to bus 121 and substituted for the corresponding data at same address from long frame buffer 342.

In order to store values in long frame buffer 342 and short frame buffer 344, post processor 334 addresses the buffers using the beam angles θ and respective ranges R which are used to address scan data memory 150 in the manner previously described. The beam angles and range value are input to processor 334 as shown in FIG. 5.

As a result of the foregoing operation of post processor 334, the values from long frame buffer 342 and short frame buffer 344 are selected in combinations such that blood flow is not displayed by display system 17 in regions determined to be wall tissue. However, the blood flow information is rapidly read from short term buffer 344 so that rapid changes in blood flow velocity are readily visible in display system 17.

Figure 6:
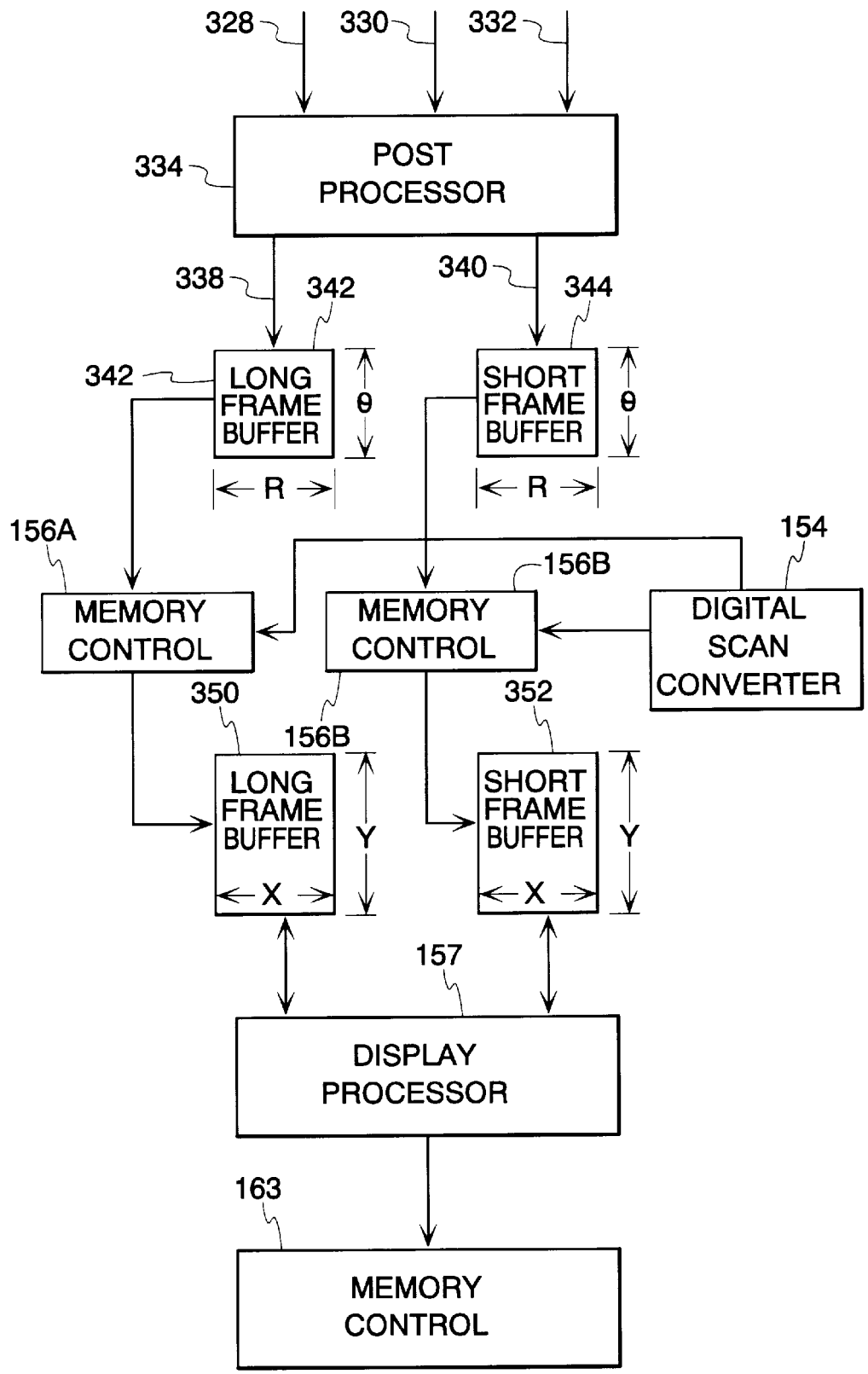
FIG. 6 is another form of the mid-processor 102 shown in FIG. 5.

FIG. 6 illustrates an alternative embodiment in which post processor 334 operates in the same manner previously described, except that values from long frame buffer 342 and short frame buffer 344 are not output to bus 121. Instead, digital scan converter 154 (FIGS. 4 and 6) operates memory control circuits 156A and 156B (FIG. 6) in order to periodically convert the values in buffers 342 and 344 to corresponding XY coordinates and stores the converted values in a long frame buffer 350 and a short frame buffer 352 as shown. The scan conversion operates in the same manner previously described in connection with FIG. 4 with respect to scan data memory 150.

Display processor 157 (FIGS. 4 and 6) selects and combines the data from long frame buffer 350 and short frame buffer 352 in the manner previously described in connection with long frame buffer 342 and short frame buffer 344, and transmits the selected combinations of values to the memory control circuit 163 (FIGS. 4 and 6). As a result of this operation, the selected and combined values from long frame buffer 350 and short frame buffer 352 are written into display data memory 161 and are processed by display controller 162 in the manner previously described.

After the values from long frame buffer 350 and short frame buffer 352 have been selected and combined by display processor 157 and have been written into display data memory 161, the resulting values in memory 161 determine the color of each pixel of display 160 in the color flow region of interest. For each pixel in the region of interest, 8 bits control the intensity of red, 8 bits control the intensity of green and 8 bits control the intensity of blue. These bit patterns are preselected such that when the flow velocity as represented by signal θ' changes in direction or magnitude, the color of the pixel at a display location X, Y is changed. For example, flow toward the transducer may be indicated as red and flow away from the transducer may be indicated as blue. The faster the flow, the brighter the color.

As another example, processor 157 may select the amount of green displayed in the pixel based on the turbulence measurement value on conductor 330 (FIG. 5). As a result, the mean flow velocity at a particular point X, Y in the displayed image may be indicated by the amount of red and blue, and the degree of turbulence may be indicated by the amount of green.

The intensity or lumens of the display changes in accordance with the value of the power signal on conductor 332.

While only certain preferred features of the invention have been illustrated and described herein, many modifications and changes will occur to those skilled in the art. For example, ECG triggering can be used to select segmentation frames which correspond to nearly the same time in the heart cycle. Otherwise, the most recent segmentation frame may be used. It is, therefore, to be understood that the appended claims are intended to cover all such modifications and changes as fall within the true spirit of the invention.

What is claimed is:

1. In an ultrasound system capable of stimulating a vibratory energy transducer to generate beams of ultrasound waves and to direct the beams at predetermined angular positions through a subject under study, improved apparatus for providing a color display of one or more characteristics of fluid flow in the tissue of the subject comprising in combination:

a controller connected to stimulate said transducer a predetermined first number of times per beam position at a predetermined first stimulation repetition rate to generate first ultrasound waves and connected to stimulate said transducer a predetermined second number of times per beam position at a predetermined second repetition rate to generate second ultrasound waves, said first number being greater than said second number;

a receiver connected to generate first receiver signals corresponding to ultrasound waves backscattered from a predetermined range of distances within the subject in response to said first ultrasound waves and connected to generate second receiver signals corresponding to ultrasound waves backscattered from the subject in response to said second ultrasound waves;

a color flow processor connected to generate first color flow signals indicating first characteristics of the fluid flow in response to the first receiver signals and to generate second color flow signals indicating second characteristics of the fluid flow in response to the second receiver signals;

a logic unit connected to select combinations of the first and second color flow signals; and a display connected to display images in response to the combined first and second color flow signals, so that fluid flow dynamics and segmentation of fluid flow from other tissue may be more easily visualized.

2. Apparatus, as claimed in claim 1, wherein the first stimulation repetition rate is less than the second stimulation repetition rate.

3. Apparatus, as claimed in claim 1, wherein the first characteristics comprise segmentation of fluid flow from tissue adjacent the fluid flow.

4. Apparatus, as claimed in claim 1, wherein the second characteristics comprise dynamic changes in velocity of the fluid flow.

5. Apparatus, as claimed in claim 1, wherein the logic unit is connected to substitute the second color flow signals for the first color flow signals in the event that the value of the first color flow signals indicate fluid flow above a predetermined threshold value.

6. Apparatus, as claimed in claim 1, wherein the logic unit is connected to combine the second color flow signals with the first color flow signals in the event that the value of the first color flow signals indicated fluid flow above a predetermined threshold value.

7. Apparatus, as claimed in claim 1, and further comprising a first memory for storing first memory signals responsive to at least the first color flow signals.

8. Apparatus, as claimed in claim 7, wherein the memory is connected to store second memory signals responsive to the second color flow signals.

9. Apparatus, as claimed in claim 7, wherein the memory is addressed in response to the predetermined angular positions and the predetermined range.

10. Apparatus, as claimed in claim 7, wherein the memory is addressed according to coordinates of the display.

11. In an ultrasound system capable of stimulating a vibratory energy transducer to generate beams of ultrasound waves and to direct the beams at predetermined angular positions through a subject under study, an improved method for providing a color display of one or more characteristics of fluid flow in the tissue of the subject comprising the steps of:

stimulating said transducer a predetermined first number of times per beam position at a predetermined first stimulation repetition rate to generate first ultrasound waves and connected to stimulate said transducer a predetermined second number of times per beam position at a predetermined second repetition rate to generate second ultrasound waves, said first number being greater than said second number;

generating first receiver signals corresponding to ultrasound waves backscattered from a predetermined range of distances within the subject in response said first ultrasound waves;

generating second receiver signals corresponding to ultrasound waves backscattered from the subject in response to said second ultrasound waves;

generating first color flow signals indicating characteristics of the fluid flow in response to the first receiver signals;

generating second color flow signals indicating second characteristics of the fluid flow in response to the second receiver signals;

selecting combinations of the first and second color flow signals; and displaying images in response to the combined first and second color flow signals, so that fluid flow dynamics and segmentation of fluid flow from other tissue may be more easily visualized.

12. A method, as claimed in claim 11, wherein the first stimulation repetition rate is less than the second stimulation repetition rate.

13. A method, as claimed in claim 11, wherein the first characteristics comprise segmentation of fluid flow from tissue adjacent the fluid flow.

14. A method, as claimed in claim 11, wherein the second characteristics comprise dynamic changes in velocity of the fluid flow.

15. A method, as claimed in claim 11, wherein the step of selecting comprises the step of substituting the second color flow signals for the first color flow signals in the event that the value of the first color flow signals indicate fluid flow above a predetermined threshold value.

16. A method, as claimed in claim 11, wherein the step of selecting comprises the step of combining the second color flow signals with the first color flow signals in the event that the value of the first color flow signals indicate fluid flow above a predetermined threshold value.

17. A method, as claimed in claim 11, and further comprising the step of storing first memory signals responsive to at least the first color flow signals.

18. A method, as claimed in claim 17, wherein the step of storing further comprises the step of storing second memory signals responsive to the second color flow signals.

19. A method, as claimed in claim 17, and further comprising the step of reading the first memory signals in response to the predetermined angular positions and the predetermined range.

20. A method, as claimed in claim 17, and further comprising the step of reading the first memory signals according to coordinates of the display.

* * * * *